March 10, 1970  R. L. GOWAN  3,500,189
AUTOMATIC SCALING SYSTEM FOR A TIME DEVICE
Filed Feb. 8, 1967  2 Sheets-Sheet 1

INVENTOR.
RICHARD L. GOWAN

March 10, 1970        R. L. GOWAN        3,500,189

AUTOMATIC SCALING SYSTEM FOR A TIME DEVICE

Filed Feb. 8, 1967        2 Sheets-Sheet 2

INVENTOR.
RICHARD L. GOWAN

United States Patent Office 3,500,189
Patented Mar. 10, 1970

3,500,189
AUTOMATIC SCALING SYSTEM FOR A TIME DEVICE
Richard L. Gowan, Coronado, Calif., assignor to the United States of America as represented by the Secretary of the Navy
Filed Feb. 8, 1967, Ser. No. 614,748
Int. Cl. G04f 9/00, 11/08
U.S. Cl. 324—68                                    4 Claims

ABSTRACT OF THE DISCLOSURE

In an interval timer, with the pulses of an oscillator gated into a counter, the frequency of oscillations must be high in the interest of high resolution but must not overflow the counter during the longest expected time interval. Here, when the counter overflows, a lower frequency oscillator is switched in, and the counting process is repeated.

---

The invention described herein may be manufactured and used by or for the Government of the United States of America for governmental purposes without the payment of any royalties thereon or therefor.

BACKGROUND

It is well known that a time interval, such as the duration of a pulse, may be measured by gating the output of an oscillator into a counter, the gate being enabled during the interval to be measured. In the case of extremely narrow pulses, resolution of the system is poor when low frequency oscillators are used. At one megacycle per second, for example, the minimum detectable incremental change in pulse width is one microsecond. An obvious method of improving resolution of narrow pulse measuring would be to increase the frequency of the oscillator. This method solves the resolution problem but introduces another problem. At the higher frequency, the counter will overflow when the pulse to be measured is too long.

The object of this invention is to provide a scaling system for changing the frequency of oscillation when the duration of the pulse changes, to optimize frequency and resolution.

SUMMARY

A plurality of oscillators of different orders of frequency are successively gated into a counter. The unknown test pulse to be measured first gates the highest frequency oscillator into the counter. If the pulse proves to be sufficiently long to exceed the capacity of the counter an overflow signal occurs, whereupon the counting process is interrupted and the next lower frequency oscillator is gated into the counter under the control of the next succeeding test pulse. When the test pulse ends without an overflow signal occurring then a readout control pulse is generated which instructs the readout process for the counter.

Figure 1:
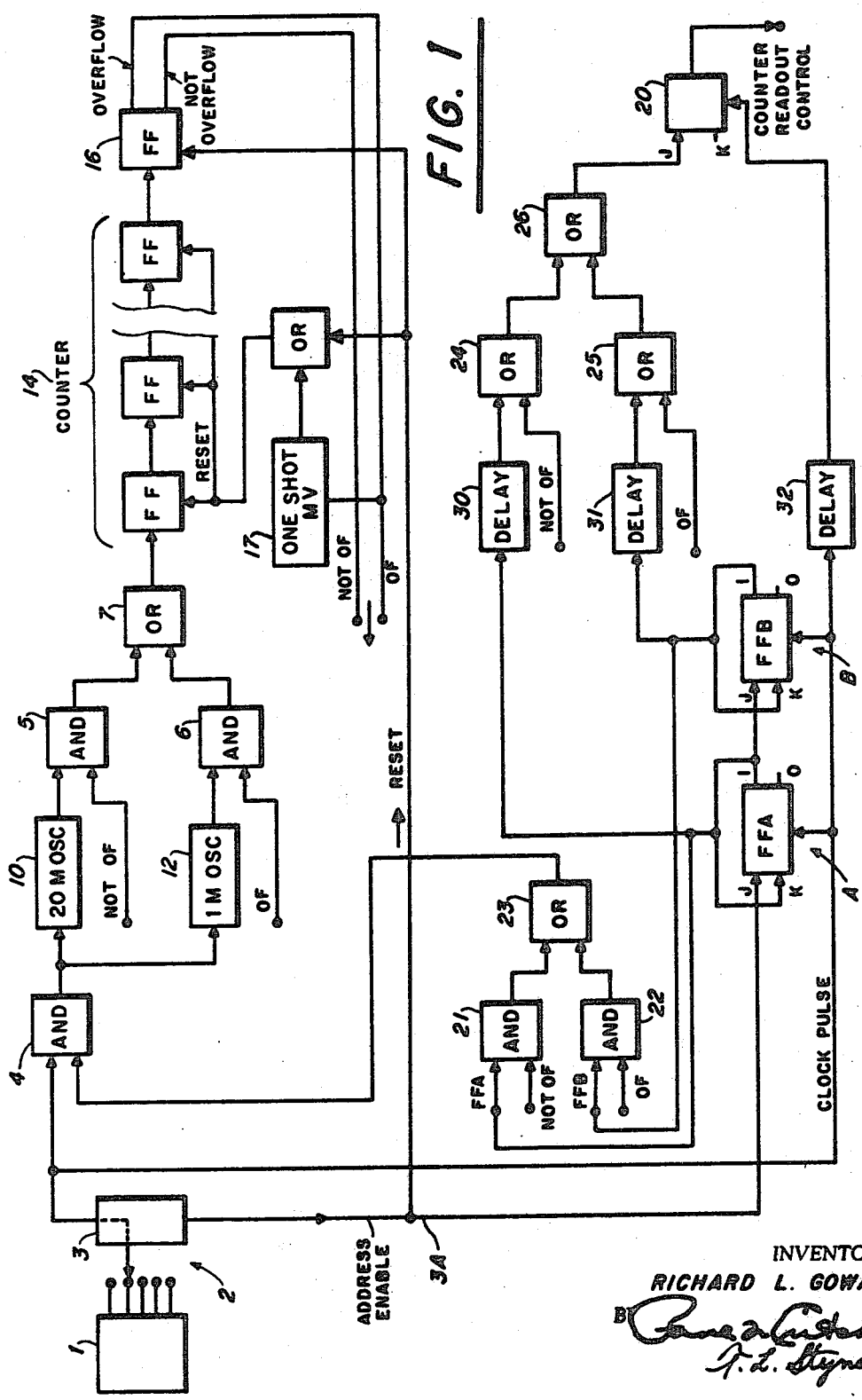
Figure 2:
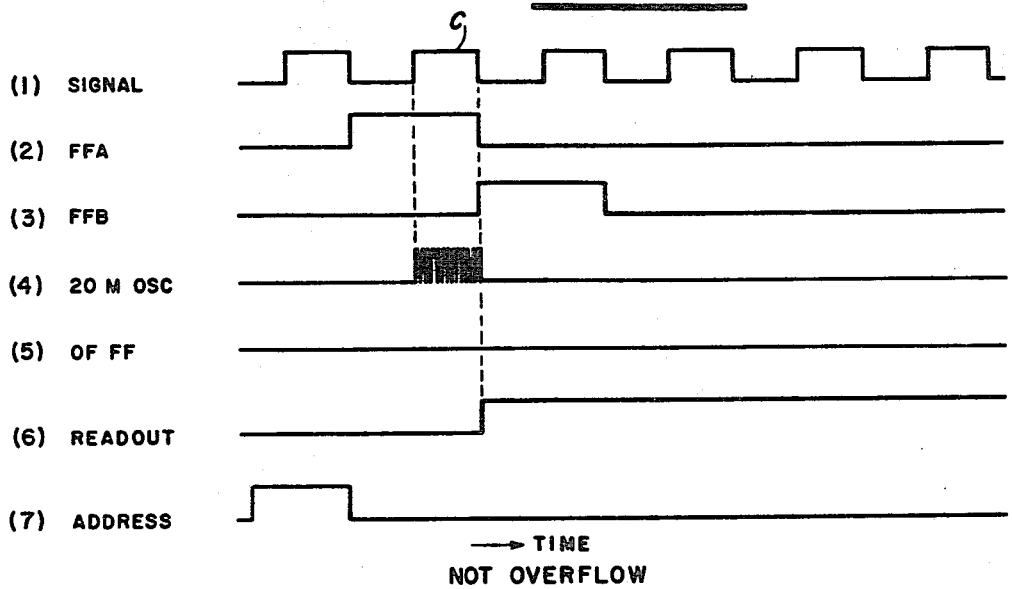
Figure 3:
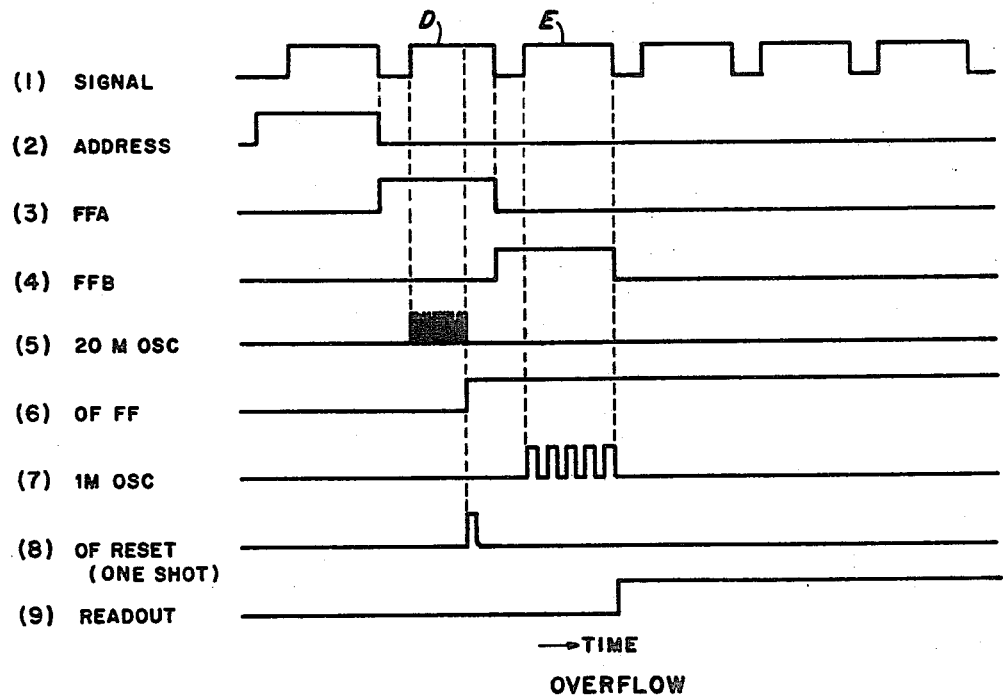

Other features and objects of this invention will become apparent to those skilled in this art by referring to the preferred embodiment described in the following specification and shown in the accompanying drawings in which:

FIG. 1 is a block diagram of the preferred embodiment;
FIGS. 2 and 3 are timing diagrams of principal voltages in the system of FIG. 1.

At 1 in FIG. 1 is represented equipment the parameters of which are to be measured. It is assumed that there are a plurality of test points 2 and that there are pulse voltages at each point, the durations of which are representative of the operating parameter to be measured.

At 3 is represented switching means for sequentially sampling the pulses or for selecting one test point at a time. Characteristically the parameter to be measured is indicated by the duration of a pulse in a series of pulses at each test point. At 10 and 12 are represented oscillators of different frequencies, which are gated one at a time into a toggle connected series of flip-flops or similar type of binary counter 14. The contents of the cascaded flip-flops contains the desired information which can be converted to decimal numbers or otherwise usefully read out. Connected to the flip-flop of greatest significance is the overflow flip-flop 16 which is triggered "on" when the counter becomes full and can receive no more input information. The two complementary output terminals are labeled "overflow" and "not overflow." Logical "0" and "1" voltages will be used throughout this disclosure.

To operate, the counter and overflow F/F is reset to "0" and one test point 2 is connected to the oscillator 10 of highest frequency. Let it be assumed that the frequency of oscillator 10 is 20 mc./sec. The 20 mc. oscillator is enabled, through AND gate 4, for the duration of the test pulse. The output of the oscillator through AND gate 5 and OR gate 7 feed directly to the counter. As long as the overflow flip-flop 16 is not activated, the "not overflow" voltage applied to AND gate 5 permits the counting to continue. If however, the test pulse is too long and the counter overflows, the overflow voltage stops further operation, whereupon oscillator 10 is disabled and oscillator 12 of lower frequency is enabled. Then the next ensuing test pulse enables oscillator 12 and the lower frequency pulses are fed into the counter. It is expected that no overflow will occur at the lower frequency and that a counter readout signal will appear at the output terminal of flop-flop 20 which initiates operation in equipment, not shown, to read out the contents of the counter. The counter must be reset for succeeding desired operations.

One set of logical circuits for performing the above outlined steps will be described in connection with the timing diagrams of FIGS. 2 and 3. First the case will be considered where the pulse A to be measured, in the series of pulses, line 1, FIG. 2, is not sufficiently long to cause overflow. Action in this case starts when the Address Enable voltage on conductor 3A from switch 3 comes "on" indicating that the desired test point at the switch has been contacted, and that the register 14 and overflow flip-flop 16 has been reset to 0. This "on" voltage permits flip-flop A to set when the trailing edge of the first test pulse (line 1, FIG. 2) occurs. Flip-flop A is of the commercially obtainable JK type and, conveniently, the clock pulse for the JK flip-flops A and B are obtained from the pulse source to be measured. Both flip-flops A and B change state simultaneously with these trailing edges as indicated on lines 2 and 3 in the timing diagrams of FIG. 2. This method of clocking the flip-flops provides the positive synchronization needed for operation of the system. The first clock pulse after Address Enable is "1," flip-flop A is set. Flip-flop A causes Address Enable to be reset, (line 7, FIG. 2) and resets itself one clock pulse later as shown at line 2, FIG. 2. The "on" voltage of flip-flop A is applied through gates 21, 23 and 4 to the oscillators to enable those oscillators which oscillate (line 4) in response to and for the duration of active pulse C (line 1). The 20 mc. oscillator emits pulses at 50 nanoseconds intervals for the duration of the incoming pulse C. Since the register 14, FIG. 1, is not forced into overflow condition as assumed, the readout voltage (line 6, FIG. 2) of flip-flop 20 is set and the conversion or readout process is completed. The readout voltage is generated in the JK flip-flop 20 by the not-overflow voltage through gates 24 and 26 to the J terminal and the clock pulse. As will appear delays in the circuits to flip-flop 20 obviates any ambiguity which might be caused by the occurrence of clock controls at or near counter overflow.

FIG. 3 represents the case in which the duration of the incoming pulse is sufficiently long to cause overflow when the higher frequency oscillator is operating. As in the case of FIG. 2, action starts when the Address Enable goes to 1 at the J input of flip-flop A. This causes flip-flop A to set at the next clock pulse as shown on line 3 of FIG. 3. The duration of the flip-flop A in the one state again allows a single pulse D from the incoming pulse train to be gated into the 20 mc. oscillator 10 through OR gates 21, 23 and 4 as in FIG. 1. The 20 mc. oscillator emits pulses, line 5, until the register 14 is forced into overflow condition, this condition is detected and indicated by setting overflow F/F 16 as shown in line 6, FIG. 3. That is, when overflow occurs the "overflow" terminal of flip-flop 16 goes high as shown on line 6, FIG. 3, while the "not-overflow" terminal goes low. This overflow voltage performs three distinct functions; first, the overflow voltage inhibits the further receipt of high frequency oscillations into the counter, secondly, the overflow voltage resets all register flip-flops in counter 14, preferably by way of the one-short multivibrator 17. Thirdly, the overflow voltage enables the low frequency oscillator 12 through gates 22, 23 and 4 which allows the next complete incoming pulse E width from the sensor switch 3 to activate the low frequency oscillator as suggested in line 7 of FIG. 3. It will appear now that switching to the lower frequency oscillator has the effect of multiplying by 20 the register capacity. The complete pulse from the sensor during the time of flip-flop B is on is digitized by the 1 mc. oscillator through gates 22, 23, 4, 12, 6, 7 and 14 of FIG. 1. As shown on line 9 of FIG. 3 the read out control (flip-flop 20) is set and the conversion of the contents to read-out is completed.

It will be observed that if the counter should fill and overflow occur at the instant of the termination of the pulse to be measured, an ambiguity can occur. Ambiguity in setting the counter readout flip-flop at the completion of a pulse width is avoided by delay techniques. The technique is to delay the logic and clock for the readout flip-flop 20 by roughly 240 nanoseconds. A delay device such as a one-shot multivibrator is inserted at 30 and 31 between flip-flops A and B and gates 24 and 25, repectively. Delay device 32 is inserted in the clock circuit between the source and the flip-flop 20. These delay devices insure that the conversion process has been completed before the ready-bit or readout voltage is set.

I claim:
1. A system for measuring the width of a pulse, said system comprising;

a counter (14) of digital signals, said counter having a predetermined capacity, a plurality of oscillators (10, 12) of different orders of frequencies, means (5, 6) for selectively connecting one at a time the outputs of said oscillators to the input of said counter, means (4) responsive to the source of the pulse to be measured for enabling all of said oscillators for the duration of one pulse to be measured, an overflow device (16) connected to said counter for generating a signal voltage when the capacity of said counter is exceeded, means (21–23, 5–7) responsive to the signal voltage of said overflow device for disabling one oscillator and enabling another oscillator of lower frequency so that said counter will not overflow during the next period of the pulse to be measured.

2. In the system defined in claim 1, the last mentioned means comprising;

an AND gate (4) connected between the source of pulses to be measured and said oscillators, and logical circuits (21–23) responsive to said overflow signal and to said series of pulses to be measured for selectively enabling and disabling said gate.

3. The system defined in claim 1 further comprising;

said overflow device comprising a flip-flop with output terminals for complementary binary signals, gates connected, respectively, between the output of each oscillator and the input of said counter, said gates being connected to said flip-flop and responsive to said complementary binary signals.

4. The system defined in claim 1 further comprising;

means responsive to an overflow signal of said overflow device for resetting said counter to zero.

References Cited

UNITED STATES PATENTS 2,806,205    9/1957    Donath.
2,851,596    9/1958    Hilton.
2,985,828    5/1961    Mason.

FOREIGN PATENTS 989,740    4/1965    Great Britain.

ALFRED E. SMITH, Primary Examiner

U.S. Cl. X.R.

328—129